United States Patent
Lin et al.

(10) Patent No.: US 9,285,580 B2
(45) Date of Patent: Mar. 15, 2016

(54) PROJECTION DEVICE AND LIGHT VALVE MODULE THEREOF

(71) Applicants: Wei-Szu Lin, Hsinchu (TW); Kang-Hsi Li, Hsinchu (TW)

(72) Inventors: Wei-Szu Lin, Hsinchu (TW); Kang-Hsi Li, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 581 days.

(21) Appl. No.: 13/657,877

(22) Filed: Oct. 23, 2012

(65) Prior Publication Data

US 2013/0293853 A1 Nov. 7, 2013

(30) Foreign Application Priority Data

May 4, 2012 (TW) .............................. 101115971 A

(51) Int. Cl.
| | |
|---|---|
| G03B 21/28 | (2006.01) |
| G02B 26/00 | (2006.01) |
| G02B 26/08 | (2006.01) |
| H04N 9/31 | (2006.01) |
| G02F 1/1333 | (2006.01) |

(52) U.S. Cl.
CPC .......... *G02B 26/0841* (2013.01); *H04N 9/3102* (2013.01); *G02F 1/133308* (2013.01); *G02F 2001/133311* (2013.01)

(58) Field of Classification Search
CPC ............. G02B 26/0833; H04N 9/3102; G02F 1/13458; G02F 1/133608; G02F 1/1336; G02F 2201/503; G02F 1/1339; G02F 1/133615; G02F 1/13452; G02F 1/133308; G02F 2001/133311; G02F 2001/133317; G02F 2201/063; F21V 17/12

USPC .................................. 349/58, 60, 14; 353/98
See application file for complete search history.

(56) References Cited

U.S. PATENT DOCUMENTS

| | | | | |
|---|---|---|---|---|
| 5,905,550 | A | * | 5/1999 | Ohgami et al. .................. 349/58 |
| 6,151,207 | A | * | 11/2000 | Kim .......................... 361/679.26 |
| 7,023,605 | B2 | | 4/2006 | Williams et al. |
| 7,854,515 | B2 | | 12/2010 | Matsuura et al. |
| 2004/0160548 | A1 | * | 8/2004 | Kojima et al. ................... 349/58 |
| 2005/0162760 | A1 | * | 7/2005 | Fujimori et al. ............. 359/820 |
| 2005/0185244 | A1 | * | 8/2005 | Fujimori et al. ............. 359/237 |
| 2006/0221312 | A1 | | 10/2006 | Matsuura et al. |

(Continued)

FOREIGN PATENT DOCUMENTS

| | | | |
|---|---|---|---|
| CN | 201903726 U | * | 7/2011 |
| CN | 102193220 | | 9/2011 |
| JP | 2005215198 | | 8/2005 |
| JP | 2008-209561 | | 9/2008 |

(Continued)

OTHER PUBLICATIONS

"Office Action of China Counterpart Application", issued on Dec. 1, 2014, p. 1-p. 8, in which the listed references were cited.

*Primary Examiner* — Christina Riddle
*Assistant Examiner* — Christopher Lamb, II
(74) *Attorney, Agent, or Firm* — Jianq Chyun IP Office

(57) ABSTRACT

A light valve module including a first shell, a second shell, a light valve, an elastic pad and a sealant is provided. The first shell has an opening. The second shell is assembled to the first shell. The first shell and the second shell form a containing space therebetween. The light valve is disposed in the containing space and is exposed by the opening. The elastic pad is disposed between the first shell and the second shell for sealing the containing space. The sealant is adhered at a periphery of the opening and the light valve for sealing the containing space. In addition, a projection device having the light valve module is also provided.

18 Claims, 3 Drawing Sheets

(56) References Cited

U.S. PATENT DOCUMENTS

2008/0019084 A1* 1/2008 Lee et al. .................... 361/679
2010/0171889 A1* 7/2010 Pantel et al. ................ 349/1
2011/0194037 A1* 8/2011 Hirabayashi et al. ........ 349/5

FOREIGN PATENT DOCUMENTS

| JP | 2011180325 | 9/2011 |
| TW | I231461 | 4/2005 |
| TW | I337293 | 2/2011 |

* cited by examiner

PROJECTION DEVICE AND LIGHT VALVE MODULE THEREOF

CROSS-REFERENCE TO RELATED APPLICATION

This application claims the priority benefit of Taiwan application serial no. 101115971, filed on May 4, 2012. The entirety of the above-mentioned patent application is hereby incorporated by reference herein and made a part of this specification.

BACKGROUND OF THE INVENTION

1. Field of the Invention

The invention relates to an optical apparatus and an optical device thereof, and more specifically, to a projection device and a light valve module thereof.

2. Description of Related Art

A projection device is a display device for generating a large-sized frame. The imaging principle of a projection device is to convert an illumination beam generated by a light source into an image beam via a light valve, and then to project the image beam onto a screen or a wall through a projection lens so as to form an image. With advancement in projection techniques and reduction in manufacturing cost of projection devices, applications of projection devices have been gradually expanded from commercial use to household use. Main components of a projection device include a light source, a light valve, and a projection lens. An illumination beam generated by a light source is converted into an image beam via a light valve, and then the image beam is projected via a projection lens.

A conventional light valve could be a digital micro-mirror device (DMD), a liquid-crystal-on-silicon panel (LCOS panel), or a transmissible liquid crystal panel. A digital micro-mirror device (DMD), for example, is formed by combining components such as a substrate, a reflective layer, a supporting layer, and a transparent plate in a laminating manner. With this type of disposition, outside moisture is prone to infiltrate into an interior of the digital micro-mirror device (DMD) through gaps among each component, and impacts a normal operation of the device.

Taiwan Patent No. I337293 has disclosed a structure of a digital micro-mirror device (DMD), wherein an optical lens is fixed with a colloid layer. U.S. Pat. No. 7,854,515 has disclosed an optical system, wherein a structure is sealed with an elastic member. U.S. Pat. No. 7,023,605 has disclosed a seal structure of a digital micro-mirror device (DMD), wherein a groove is formed by an inner side of a metal shell and an outer side of a silicon glass, and the metal shell and the silicon glass are adhered at the channel with a binding material.

SUMMARY OF THE INVENTION

The invention provides a light valve module, which prevents moisture from entering an interior of a light valve.

The invention provides a projection device, wherein a light valve module prevents moisture from entering an interior of the light valve.

Other objects and advantages of the invention can be further understood by the technical features disclosed in the invention.

To achieve one or a part of or all of the aforementioned objects or other objects, an embodiment of the invention provides a light valve module, including a first shell, a second shell, a light valve, an elastic pad and a sealant. The first shell has an opening. The second shell is assembled to the first shell. The first shell and the second shell form a containing space therebetween. The light valve is disposed in the containing space and is exposed by the opening. The elastic pad is disposed between the first shell and the second shell for sealing the containing space. The sealant is adhered at a periphery of the opening and the light valve for sealing the containing space.

To achieve one or a part of or all of the aforementioned objects or other objects, an embodiment of the invention provides a projection device including a light source, an optical module, and a projection lens. The light source is capable of emitting an illuminating beam. The optical module is disposed on a transmission path of the illumination beam and has a light valve module. The light valve module is capable of converting the illumination beam into an image beam. The light valve module includes a first shell, a second shell, a light valve, an elastic pad and a sealant. The first shell has an opening. The second shell is assembled to the first shell. The first shell and the second shell form a containing space therebetween. The light valve is disposed in the containing space and is exposed by the opening. The elastic pad is disposed between the first shell and the second shell for sealing the containing space. The sealant is adhered at a periphery of the opening and the light valve for sealing the containing space. The projection lens is capable of converting the image beam into a projection beam.

According to the aforementioned, in the embodiments of the invention, the light valve is disposed in the containing space that is formed between the first shell and the second shell, and the containing space is sealed with the elastic pad and the sealant. By doing so, outside moisture is effectively prevented from entering the containing space through a gap between the first shell and the second shell or through the opening of the first shell; as a result, the light valve is prevented from contacting moisture, and a normal operation of the light valve is ensured.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described.

The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
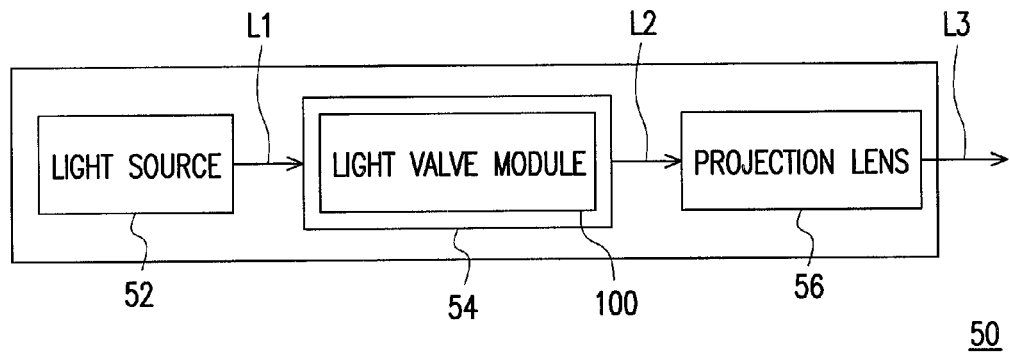
FIG. 1 is a schematic view showing a projection device of an embodiment of the invention.

FIG. 1 is a schematic view showing a projection device of an embodiment of the invention. Please refer to FIG. 1. A projection device 50 of the embodiment includes a light source 52, an optical module 54, and a projection lens 56. The light source 52 is used to emit an illumination beam L1. The optical module 54 is disposed on a transmission path of the illumination beam L1, and the optical module 54 has a light valve module 100. The light valve module 100 is capable of converting the illumination beam L1 into an image beam L2.

Figure 2:
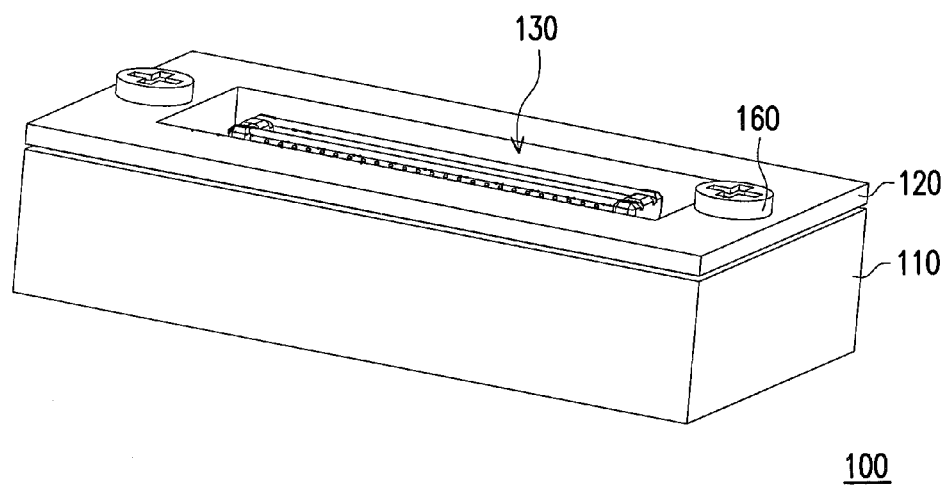
FIG. 2 is a three-dimensional view showing the light valve module of FIG. 1.
Figure 3:
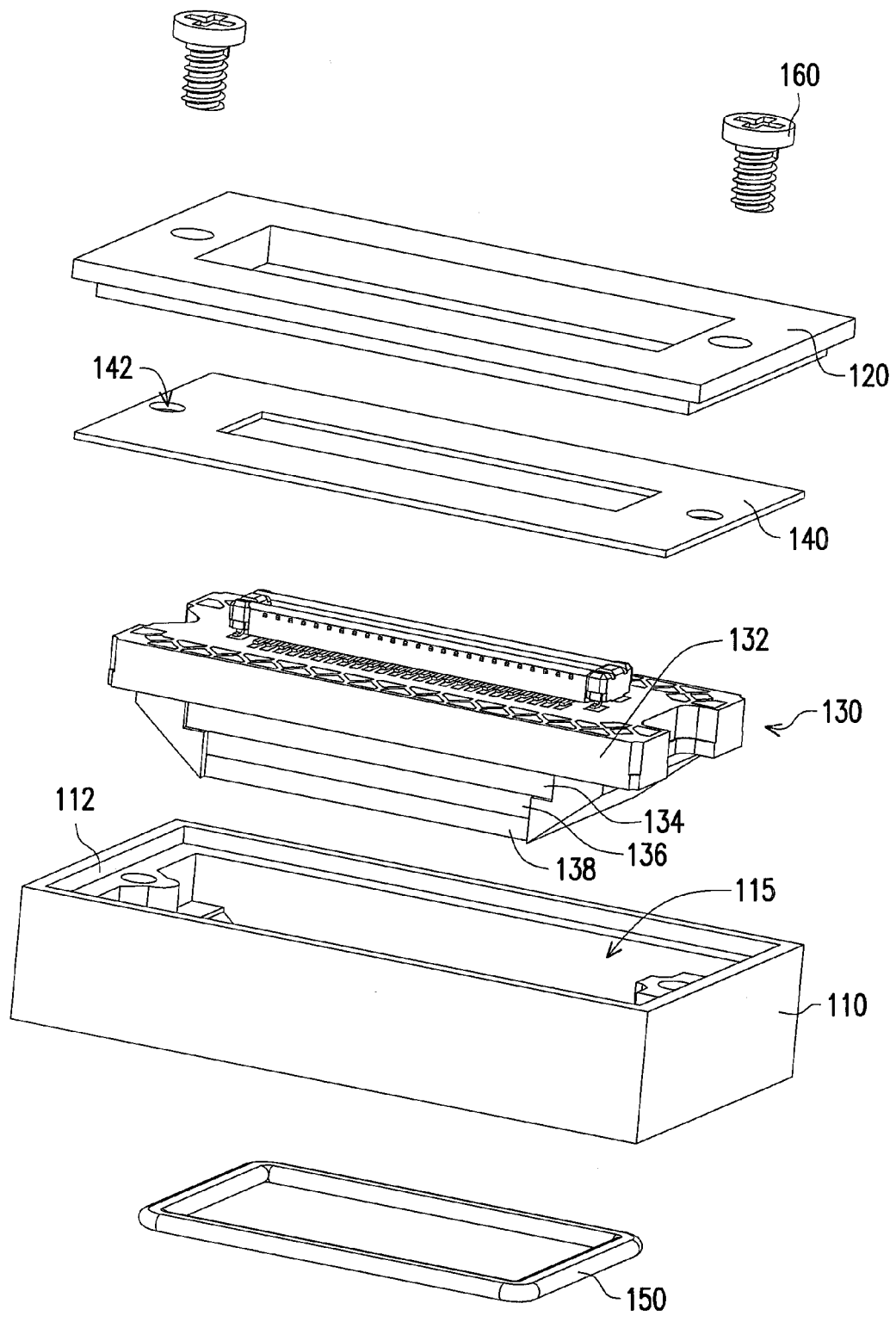
FIG. 3 is an explosive view showing the light valve module of FIG. 2.

FIG. 2 is a three-dimension view showing the light valve module of FIG. 1. FIG. 3 is an explosive view showing the light valve module of FIG. 2. Please refer to FIG. 1 and FIG. 2. The light valve module 100 of the embodiment includes a first shell 110, a second shell 120, a light valve 130, an elastic pad 140, and a sealant 150. The light valve module 100 is, for example, a digital micro-mirror device (DMD) and is applicable to a projector. In other embodiments, the light valve module 100 could be a liquid-crystal-on-silicon panel (LCOS panel), a transmissible liquid crystal panel, or other suitable type of light valve module, and the invention is not limited hereto.

Figure 4:
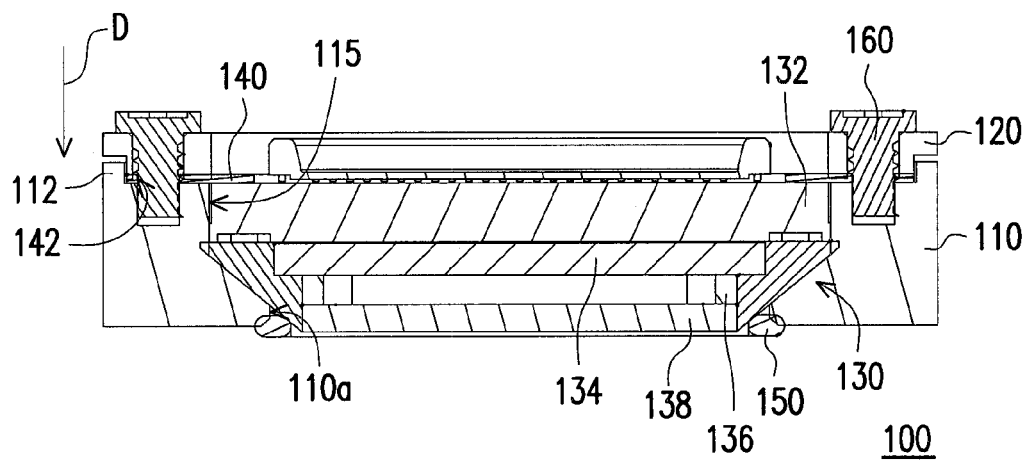
FIG. 4 is a cross-sectional view showing the light valve module of FIG. 3.
Figure 5:
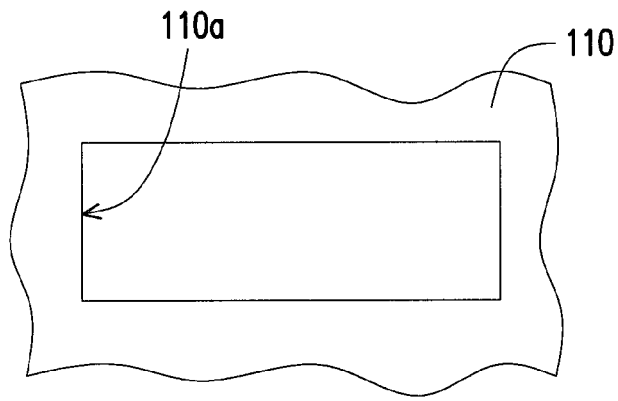
FIG. 5 is a partial top view showing the first shell of FIG. 3.

FIG. 4 is a cross-sectional view showing the light valve module of FIG. 3. FIG. 5 is a partial top view showing the first shell of FIG. 3. Please refer to FIG. 4 and FIG. 5. The second shell 120 is assembled to the first shell 110. The first shell 110 and the second shell 120 form a containing space 115 therebetween, and the light valve 130 is disposed in the containing space 115. The elastic pad 140 is disposed between the first shell 110 and the second shell 120 for sealing the containing space 115. In addition, the first shell 110 has an opening 110a. The light valve 130 is exposed by the opening 110a, such that the image beam generated by the light valve 130 is projected through the opening 110a. The sealant 150 is adhered at a periphery of the opening 110a and the light valve 130 for sealing the containing space 115.

With the above-mentioned disposition, outside moisture is effectively prevented from entering the containing space 115 through a gap between the first shell 110 and the second shell 120 or the opening 110a of the first shell 110 by sealing the containing space 115 with the elastic pad 140 and the sealant 150; as a result, the light valve 130 is prevented from contacting moisture, and a normal operation of the light valve 130 is ensured.

In the embodiment, materials of the elastic pad 140 could include rubber or other suitable elastic materials, and the invention is not limited hereto. In addition, materials of the sealant 150 could include silicon or other suitable materials, and the invention is not limited hereto.

Please refer to FIG. 3 and FIG. 4. More specifically, the light valve 130 of the embodiment includes a substrate 132, a reflective layer 134, a supporting layer 136, and a transparent plate 138. The reflective layer 134 is laminated on the substrate 132 and is used to reflect the illumination beam L1 from the light source 52 in the projection device 50 (illustrated in FIG. 1) so as to form an image beam. The supporting layer 136 is laminated on the reflective layer 134 and exposes the reflective layer 134. The transparent plate 138 is laminated on the supporting layer 136, and the image beam L2 from the reflecting layer 134 is projected through the transparent plate 138. With the light valve 130 being disposed in such a laminating manner, by blocking outside moisture with the first shell 110, the second shell 120, the elastic pad 140 and the sealant 150, moisture is prevented from infiltrating into an interior of the light valve 130 through gaps among the substrate 132, the reflective layer 134, the supporting layer 136, and the transparent plate 138.

In the embodiment, the light valve module 100 further includes a plurality of fastening components 160 (two are illustrated herein), and the fastening components 160 are, for example, screws, and are used to fasten the second shell 120 to the first shell 110. As shown in FIG. 4, each of the fastening components 160 fastens the second shell 120 to the first shell 110 along a direction D, and the second shell 120 compresses the elastic pad 140 towards the first shell 110 along the direction D by using a fastening power of the fastening components 160, such that the containing space 115 between the first shell 110 and the second shell 120 is effectively sealed by the elastic pad 140.

Please refer to FIG. 3 and FIG. 4. The elastic pad 140 of the embodiment has a plurality of openings 142 (two are illustrated herein). The fastening components 160 are fastened to the first shell 110 by penetrating the elastic pad 140 via the openings 142. In addition, the first shell 110 has an annular protruding rib 112. The elastic pad 140 and the second shell 120 are confined inside the annular protruding rib 112, so as to fix the relative positions of the elastic pad 140 and the second shell 120 to the first shell 110.

Figure 6:
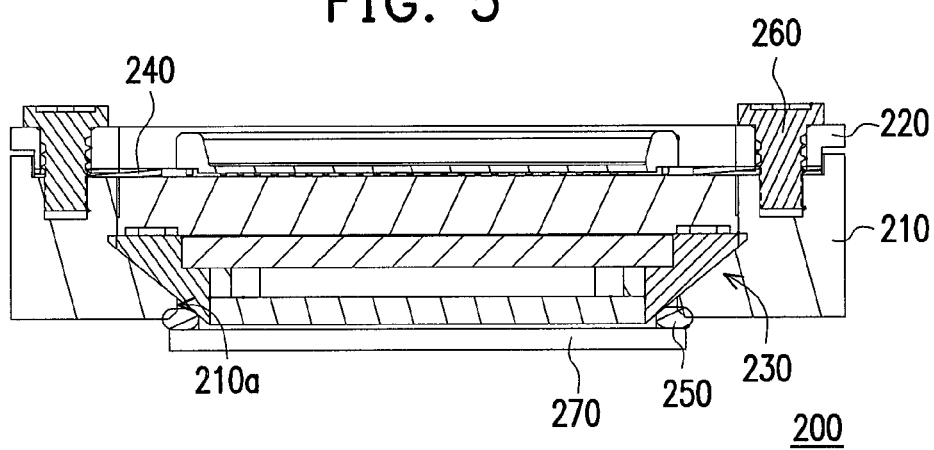
FIG. 6 is a cross-sectional view showing a light valve module of another embodiment of the invention.

FIG. 6 is a cross-sectional view showing a light valve module of another embodiment of the invention. Please refer to FIG. 6. In a light valve module 200 of the embodiment, a first shell 210, a second shell 220, a light valve 230, an elastic pad 240, a sealant 250, and fastening components 260 are disposed in the same manner as the first shell 110, the second shell 120, the light valve 130, the elastic 140, the sealant 150, and the fastening components 160 shown in FIG. 4. Therefore, further descriptions are omitted herein. The difference between the light valve module 200 and the light valve module 100 is that the light valve module 200 in the embodiment further includes a transparent plate 270. The transparent plate 270 covers an opening 210a of the first shell 210 for protecting the light valve 230. In addition, the transparent plate 270 is fixed, for example, by being adhered to the sealant 250. In other embodiments, the transparent plate 270 could be fixed using other suitable methods, and the invention is not limited hereto.

In summary, in the aforementioned embodiments of the invention, the light valve is disposed in the containing space that is formed between the first shell and the second shell, and the containing space is sealed with the elastic pad and the sealant. By doing so, outside moisture is effectively prevented from entering the containing space through a gap between the first shell and the second shell or the opening of the first shell; as a result, the light valve is prevented from contacting moisture, and a normal operation of the light valve is ensured.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light valve module, comprising:
    a first shell having an opening and an annular protruding rib;
    a second shell assembled to the first shell, wherein the first shell and the second shell form a containing space therebetween;
    a light valve disposed in the containing space and exposed by the opening;
    an elastic pad disposed between the first shell and the second shell for sealing the containing space and preventing moisture from entering the containing space, wherein the elastic pad and the second shell are confined in the annular protruding rib; and
    a sealant adhered at a periphery of the opening and the light valve for sealing the containing space and preventing the moisture from entering the containing space.

2. The light valve module as recited in claim 1, wherein the light valve comprises:
    a substrate;
    a reflective layer laminated on the substrate;
    a supporting layer laminated on the reflective layer and exposing the reflective layer; and
    a transparent plate laminated on the supporting layer.

3. The light valve module as recited in claim 1, further comprising a plurality of fastening components, wherein the fastening components fasten the second shell to the first shell.

4. The light valve module as recited in claim 3, wherein the elastic pad has a plurality of openings, and the fastening components penetrate the elastic pad through the openings.

5. The light valve module as recited in claim 3, wherein each of the fastening components fastens the second shell to the first shell along one direction, and the second shell compresses the elastic pad toward the first shell along the direction.

6. The light valve module as recited in claim 1, wherein a material of the elastic pad comprises rubber.

7. The light valve module as recited in claim 1, wherein a material of the sealant comprises silicon.

8. The light valve module as recited in claim 1, further comprising a transparent plate, wherein the transparent plate covers the opening of the first shell.

9. The light valve module as recited in claim 8, wherein the sealant is adhered to the transparent plate.

10. A projection device, comprising:
    a light source capable of emitting an illumination beam;
    an optical module disposed on a transmission path of the illumination beam and having a light valve module, wherein the light valve module is capable of converting the illumination beam into an image beam, and the light valve module comprises:
    a first shell having an opening and an annular protruding rib;
    a second shell assembled to the first shell, wherein the first shell and the second shell form a containing space therebetween;
    a light valve disposed in the containing space and exposed by the opening;
    an elastic pad disposed between the first shell and the second shell for sealing the containing space and preventing moisture from entering the containing space, wherein the elastic pad and the second shell are confined in the annular protruding rib; and
    a sealant adhered at a periphery of the opening and the light valve for sealing the containing space and preventing the moisture from entering the containing space; and
    a projection lens capable of converting the image beam into a projection beam.

11. The projection device as recited in claim 10, wherein the light valve comprises:
    a substrate;
    a reflective layer laminated on the substrate;
    a supporting layer laminated on the reflective layer and exposing the reflecting layer; and
    a transparent plate laminated on the supporting layer.

12. The projection device as recited in claim 10, wherein the light valve module further comprises a plurality of fastening components, wherein the fastening components fasten the second shell to the first shell.

13. The projection device as recited in claim 12, wherein the elastic pad has a plurality of openings, and the fastening components penetrate the elastic pad through the openings.

14. The projection device as recited in claim 12, wherein each of the fastening components fastens the second shell to the first shell along one direction, and the second shell compresses the elastic pad toward the first shell along the direction.

15. The projection device as recited in claim 10, wherein a material of the elastic pad comprises rubber.

16. The projection device as recited in claim 10, wherein a material of the sealant comprises silicon.

17. The projection device as recited in claim 10, further comprising a transparent plate, wherein the transparent plate covers the opening of the first shell.

18. The projection device as recited in claim 17, wherein the sealant is adhered to the transparent plate.

* * * * *